(12) United States Patent
Zhao et al.

(10) Patent No.: US 11,370,435 B2
(45) Date of Patent: Jun. 28, 2022

(54) CONNECTED AND AUTOMATED VEHICLES, DRIVING SYSTEMS, AND CONTROL LOGIC FOR INFO-RICH ECO-AUTONOMOUS DRIVING

(71) Applicants: GM GLOBAL TECHNOLOGY OPERATIONS LLC, Detroit, MI (US); Carnegie Mellon University, Pittsburgh, PA (US)

(72) Inventors: Junfeng Zhao, Troy, MI (US); Chen-Fang Chang, Bloomfield Hills, MI (US); Bharatkumar Hegde, Bloomfield Hills, MI (US); Insu Chang, Troy, MI (US); Ragunathan Rajkumar, Monroeville, PA (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 300 days.

(21) Appl. No.: 16/559,738

(22) Filed: Sep. 4, 2019

(65) Prior Publication Data
US 2021/0061278 A1 Mar. 4, 2021

(51) Int. Cl.
*B60W 30/18* (2012.01)
*G05D 1/00* (2006.01)
(Continued)

(52) U.S. Cl.
CPC ............ *B60W 30/18* (2013.01); *B60W 10/04* (2013.01); *B60W 10/20* (2013.01); *B60W 40/06* (2013.01);
(Continued)

(58) Field of Classification Search
None
See application file for complete search history.

(56) References Cited

U.S. PATENT DOCUMENTS 5,913,917 A 6/1999 Murphy
9,759,573 B2 * 9/2017 Meyer ................ G01C 21/3469
(Continued)

FOREIGN PATENT DOCUMENTS

| AT | 520905 A1 * | 8/2019 | |
|---|---|---|---|
| DE | 102012224040 A1 * | 6/2014 | ............. G06Q 10/04 |
| WO | WO-2015051289 A1 * | 4/2015 | ......... G01C 21/3469 |

*Primary Examiner* — Sze-Hon Kong
*Assistant Examiner* — Davin Seol
(74) *Attorney, Agent, or Firm* — Quinn IP Law

(57) ABSTRACT

A method for controlling automated driving operations of a vehicle includes determining vehicle origin and destination data, and generating a graphical representation of a road network with multiple candidate routes between the vehicle's origin and destination. Road-level data, including speed, turn angle, and/or gradient data, is received for each candidate route, and respective total energy uses are estimated for the vehicle to traverse across the candidate routes. Multiple candidate driving strategies, each having respective speed and acceleration profiles, are determined for the candidate route with the lowest estimated total energy use. An optimal candidate driving strategy is selected through a cost evaluation of the associated speed and acceleration profiles and forward movement simulations of the vehicle over a prediction horizon. Command signals are transmitted to the vehicle's steering and/or powertrain systems to execute control operations based on the optimal driving strategy and the candidate route with the lowest energy use.

23 Claims, 5 Drawing Sheets

(51) Int. Cl.
*B60W 10/04* (2006.01)
*B60W 10/20* (2006.01)
*B60W 40/06* (2012.01)

(52) U.S. Cl.
CPC ....... *G05D 1/0088* (2013.01); *B60W 2552/00* (2020.02); *B60W 2554/00* (2020.02); *B60W 2554/801* (2020.02); *B60W 2554/804* (2020.02); *B60W 2710/20* (2013.01); *B60W 2720/106* (2013.01); *G05D 2201/0213* (2013.01)

(56) References Cited

U.S. PATENT DOCUMENTS

| | | | |
|---|---|---|---|
| 10,081,360 B2 | 9/2018 | Hu et al. | |
| 10,816,351 B1* | 10/2020 | Yao | G01C 21/3492 |
| 11,079,753 B1* | 8/2021 | Roy | G05D 1/0038 |
| 11,092,446 B2* | 8/2021 | Iagnemma | G01C 21/3461 |
| 11,150,660 B1* | 10/2021 | Kabirzadeh | G06F 30/20 |
| 2009/0259363 A1 | 10/2009 | Li et al. | |
| 2010/0010732 A1 | 1/2010 | Hailman | |
| 2011/0040438 A1 | 2/2011 | Kluge et al. | |
| 2012/0232783 A1 | 9/2012 | Calkins et al. | |
| 2014/0195093 A1* | 7/2014 | Litkouhi | B60W 30/16 701/23 |
| 2015/0046076 A1* | 2/2015 | Costello | G01C 21/3691 701/118 |
| 2015/0269292 A1* | 9/2015 | Shin | G01C 21/3469 703/2 |
| 2017/0370738 A1* | 12/2017 | Park | G01C 21/3415 |
| 2018/0045527 A1* | 2/2018 | Baker | G01C 21/3617 |
| 2018/0174449 A1* | 6/2018 | Nguyen | G08G 1/0104 |
| 2018/0231389 A1* | 8/2018 | De Nunzio | B60W 50/14 |
| 2019/0113927 A1* | 4/2019 | England | G05D 1/0231 |
| 2019/0382024 A1* | 12/2019 | Ishioka | B60W 50/14 |
| 2020/0055402 A1* | 2/2020 | Camhi | B60W 30/18127 |
| 2020/0249033 A1* | 8/2020 | Gelhar | G01C 21/3453 |
| 2021/0233393 A1* | 7/2021 | Sievers | G08G 1/0145 |

* cited by examiner

CONNECTED AND AUTOMATED VEHICLES, DRIVING SYSTEMS, AND CONTROL LOGIC FOR INFO-RICH ECO-AUTONOMOUS DRIVING

STATEMENT REGARDING FEDERALLY SPONSORED RESEARCH AND DEVELOPMENT

This invention was made with U.S. Government support under Contract No. DE-AR0000790 between General Motors, LLC, and the United States Department of Energy (DOE), Advanced Research Projects Agency-Energy (ARPA-E). The U.S. Government has certain rights in the invention.

INTRODUCTION

The present disclosure relates generally to motor vehicles with automated driving capabilities. More specifically, aspects of this disclosure relate to intelligent motor vehicles with control logic for predictive eco-route planning and adaptive driving control.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS), along with autonomous driving features, are also available on many modern-day automobiles.

As vehicle processing, communication, and sensing capabilities continue to improve, manufacturers will persist in offering more system-automated driving capabilities with the aspiration of eventually producing fully autonomous vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated route generation systems utilize vehicle state and dynamics sensors, map and road condition data, and path prediction algorithms to provide path derivation with automated lane center and lane change forecasting. Computer-assisted rerouting techniques offer predicted alternative travel routes that may be updated, for example, based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit information associated with the vehicle's current location. Autonomous driving and advanced driver assistance systems are often able to adapt certain automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving instructions on a geocoded and annotated map with optional voice commands output by the in-vehicle audio system.

SUMMARY

Presented herein are intelligent vehicle systems with attendant control logic for predictive route planning and adaptive driving control, methods for manufacturing and methods for operating such systems, and motor vehicles with real-time eco-routing and vehicle dynamics and powertrain (VD&PT) control capabilities. By way of example, an Info-Rich Eco-Autonomous Driving (iREAD) system architecture is presented that provides a comprehensive framework to integrate eco-driving functionality into connected and automated vehicles (CAVs). Based on a universal canonical data-exchange architecture of CAVs, the iREAD system embeds eco-driving protocols into the vehicle's autonomous decision-making modules. Preview information provided in different resolutions is fused with vehicle energy efficiency data and occupant security and comfort data for multi-layer co-optimization within a CAVs supervisory control architecture.

Attendant benefits for at least some of the disclosed concepts include enhanced iREAD system architectures that optimize overall vehicle energy efficiency while concomitantly reducing driving time and improving occupant comfort and security. In addition to improving vehicle energy efficiency, disclosed features also help to extend automated and autonomous driving functionality to disparate roadway topographies and continuously changing driving scenarios. ADAS and self-driving vehicle frameworks implementing disclosed eco-routing techniques help to enhance passenger comfort while minimizing the risk of collision. Enhanced vehicle energy consumption and dynamics analysis also helps to ensure top-level automated driving performance, yielding more consistent and reliable system operation, without requiring the addition of dedicated sensors and hardware.

Aspects of this disclosure are directed to methods for making and methods for using any of the disclosed motor vehicles, automated driving systems, and/or iREAD eco-driving architectures. In an example, a method is presented for governing automated driving operations of a motor vehicle. This representative method includes, in any order and in any combination with any of the above and below disclosed options and features, determining, e.g., via a resident or remote vehicle controller through cooperative operation with a graphical human-machine interface (HMI) and a GPS transceiver, cellular data chip, etc., a vehicle origin and a vehicle destination for the motor vehicle. Using this geopositional data, the method conducts, e.g., via the vehicle controller through a resident or remote memory-stored map database, a geospatial query to generate a graphical representation of a road network between the vehicle origin and the vehicle destination with multiple candidate routes for the motor vehicle. The method also receives, e.g., via the vehicle controller from the map database or a cloud computing resource service, respective road-level data-speed, turn angle, and/or gradient-associated with each of the candidate routes connecting the vehicle origin and destination within the road network.

Continuing with the discussion of the above example, the method also estimates, e.g., via the vehicle controller using one or more look-up tables based on at least the respective road-level data, a respective total energy use of the motor vehicle to traverse from the vehicle origin to the vehicle destination across each of the candidate routes. Upon estimating the total energy uses for the candidate routes, the method determines, e.g., via the vehicle controller for the candidate route with the lowest estimated total energy use as selected using a Dijkstra's algorithm, multiple candidate driving strategies each having respective speed and acceleration profiles. An optimal candidate driving strategy is selected using a multi-objective cost evaluation of the associated speed and acceleration profiles and a forward simulation of movement of the motor vehicle and a lead vehicle, if any, over a calibrated prediction horizon. The vehicle controller then transmits one or more command signals to the vehicle's steering and/or powertrain systems to execute, e.g., one or more lateral and longitudinal control operations, based on the optimal candidate driving strategy and the selected candidate route with the lowest estimated total energy use.

Additional aspects of this disclosure are directed to motor vehicles with real-time eco-routing and vehicle dynamics and powertrain (VD&PT) control capabilities. As used herein, the terms "vehicle" and "motor vehicle" may be used interchangeably and synonymously to include any relevant vehicle platform, such as passenger vehicles (e.g., combustion engine, hybrid, full electric, fully and partially autonomous, etc.), commercial vehicles, industrial vehicles, tracked vehicles, off-road and all-terrain vehicles (ATV), motorcycles, farm equipment, watercraft, aircraft, etc. For purposes of this disclosure, the terms "automated" and "autonomous" may be used synonymously and interchangeably to include vehicles and vehicle systems provisioning assisted and/or fully autonomous driving capabilities, including any vehicle platform classified as a Society of Automotive Engineers (SAE) Level 2, 3, 4 or 5 vehicle. SAE Level 2, for example, allows for unassisted and partially assisted driving with sufficient automation for limited vehicle control, such as auto steer and full-speed range active cruise control (FSRACC), while obliging immediate driver intervention. At the upper end of the spectrum is Level 5 automation that altogether eliminates human intervention from vehicle driving operation, e.g., eliminating the steering wheel, throttle and brake pedals, shift knob, etc.

In an example, a motor vehicle is presented that includes a vehicle body with multiple road wheels and other standard original equipment. A vehicle steering system is mounted on the vehicle body and operable to govern the motor vehicle's heading. In addition, a vehicle powertrain with a prime mover, which may be embodied as an internal combustion engine (ICE) assembly and/or an electric traction motor, is mounted to the vehicle body and operates to drive one or more of the road wheels to thereby propel the vehicle. Also attached to the vehicle body is a vehicle controller, which may be embodied as an electronic control unit or a network of distributed controllers or control modules that regulate operation of one or more resident vehicle systems.

Continuing with the foregoing discussion of the representative motor vehicle, the vehicle controller is programmed to determine a vehicle origin and a vehicle destination for the motor vehicle, and then conduct a geospatial query with a memory-stored map database to generate a graphical representation of a road network between the vehicle origin and the vehicle destination with multiple candidate routes for the motor vehicle. The controller also receives respective road-level data for each candidate route, including speed, turn angle, and/or gradient data, and then estimates, based on this road-level data, total energy use of the motor vehicle to traverse from the vehicle origin to the vehicle destination across each candidate route. For the candidate route with the lowest estimated total energy use, the controller identifies multiple candidate driving strategies, each of which has respective speed and acceleration profiles. An optimal driving strategy is selected through a cost evaluation of the associated speed and acceleration profiles and a forward simulation of movement of the motor vehicle and a lead vehicle, if any, over a calibrated prediction horizon. The controller then transmits one or more command signals to the vehicle's steering and/or powertrain systems to execute one or more control operation based on the optimal candidate driving strategy for the candidate route with the lowest estimated total energy use.

Additional aspects of the present disclosure are directed to techniques, algorithms, and logic for operating or manufacturing any of the disclosed vehicles, systems, and devices. Aspects of the present disclosure are also directed to iREAD eco-driving architectures and automated or autonomous control systems for governing operation of vehicle systems. Also presented herein are non-transitory, computer readable media storing instructions executable by at least one of one or more processors of one or more programmable control units, such as an electronic control unit (ECU) or control module, to govern operation of a disclosed vehicle, system, or device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
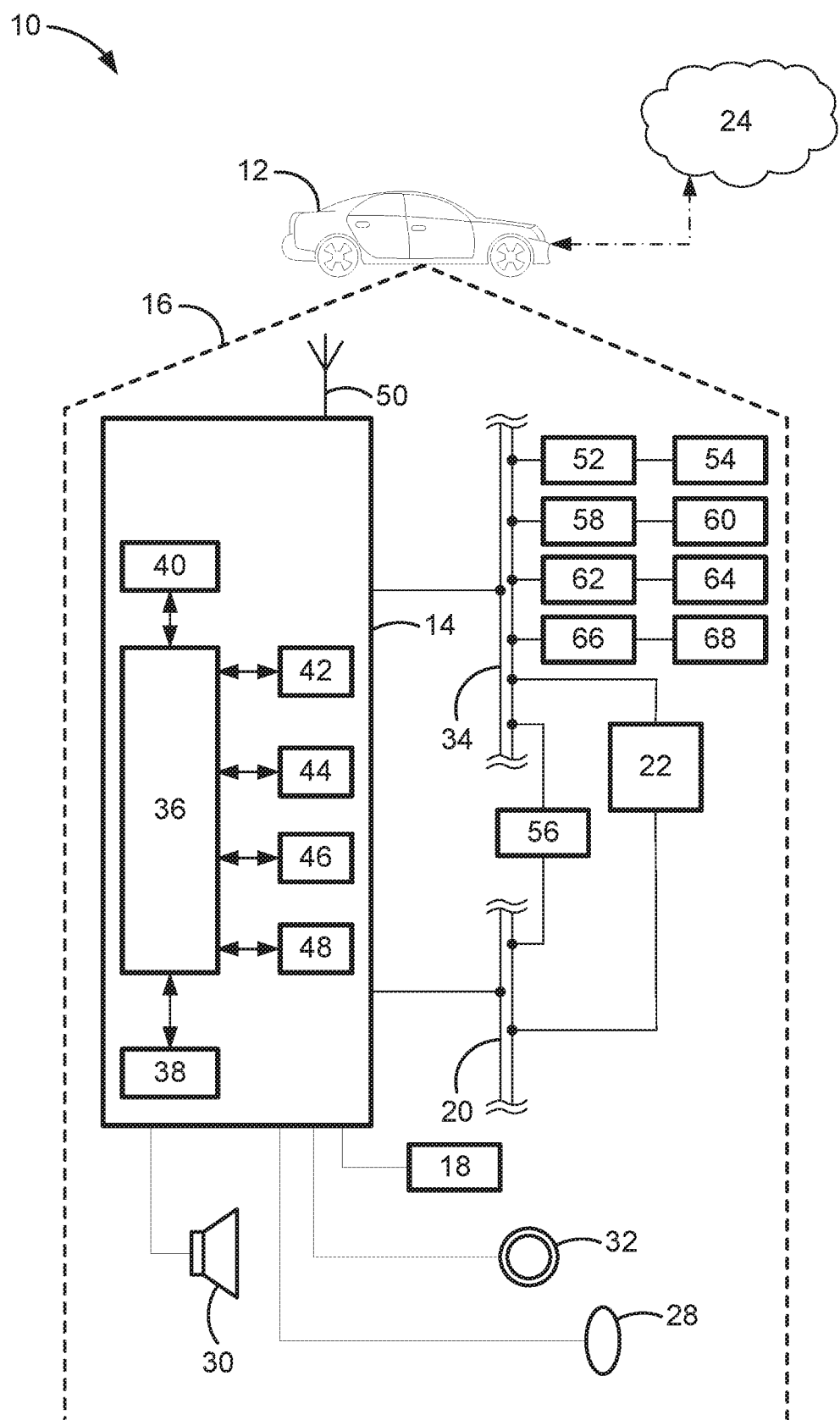
FIG. 1 is a schematic illustration of a representative motor vehicle with a network of in-vehicle controllers, sensing devices, and communication devices for executing eco-routing techniques and automated driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more automated or autonomous driving operations. The illustrated automobile 10—also referred to herein as "motor vehicle" or "vehicle" for short—is merely an exemplary application with which aspects and features of this disclosure may be practiced. In the same vein, implementation of the present concepts for the specific autonomous driving systems and operations discussed below should also be appreciated as exemplary applications of novel features disclosed herein. As such, it will be understood that aspects and features of this disclosure may be applied to alternative automated driving system architectures, utilized for other automated driving operations, and implemented for any logically relevant type of motor vehicle. Moreover, only select components of the automated driving systems and motor vehicles are shown and will be described in additional detail herein. Nevertheless, the vehicles and systems discussed herein may include numerous additional and alternative features, and other available peripheral components, for example, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, satellite service, etc.) with a remotely located or "off-board" cloud computing service system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, touchpads, keyboards, touchscreens, etc.). Generally, these hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing audio filtering, editing, and analysis software modules. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, modulating engine throttle and/or motor output, engaging/disengaging the brake system, and other automated driving functions. For instance, telematics unit 14 receives and/or transmits data to/from an autonomous systems control module (ACM) 52, an engine control module (ECM) 54, a powertrain control module (PCM) 56, a sensor system interface module (SSIM) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communication devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, infrared, light-based or other electromagnetic signals (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies surrounding driving conditions, determines characteristics of road surface conditions, identifies objects within a detectable range of the vehicle 10, determines attributes of the target object, such as size, relative position, angle of approach, relative speed, etc., and executes automated control maneuvers based on these executed operations.

These sensors are distributed throughout the motor vehicle 10 in operatively unobstructed positions relative to views fore and aft or on port and starboard sides of the vehicle. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

Figure 2:
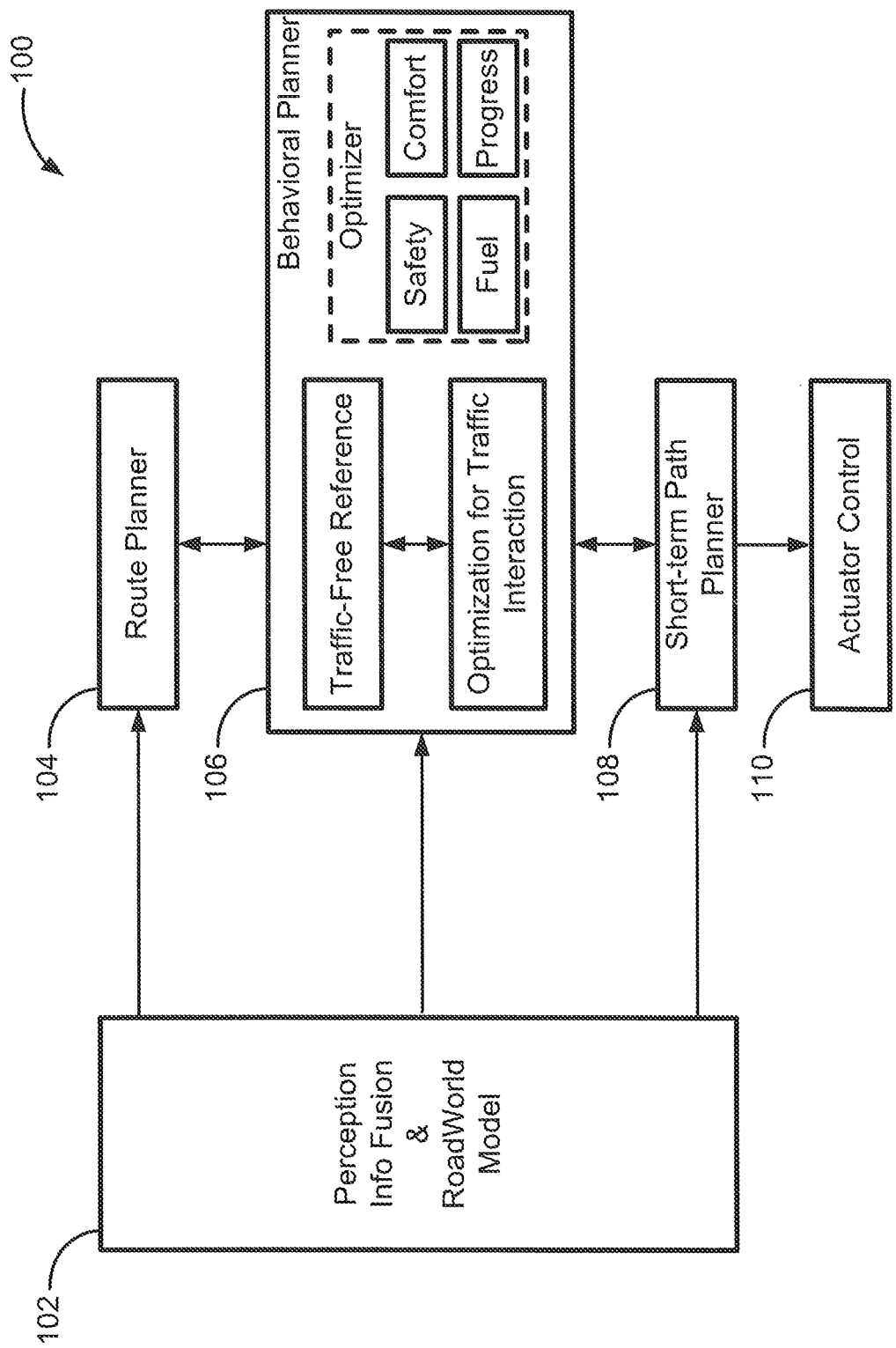
FIG. 2 is a schematic illustration of a representative Info-Rich Eco-Autonomous Driving system architecture provisioning eco-driving functionality for connected and automated vehicles in accord with aspects of the disclosed concepts.

With reference next to FIG. 2, there is shown a representative Info-Rich Eco-Autonomous Driving (iREAD) system 100 architecture with a comprehensive framework that enables eco-driving functionality for a connected and automated vehicle (CAV) to optimize their overall energy efficiency as well as safety, comfort, and trip duration. Using a universal canonical data-exchange architecture, iRead System 100 embeds eco-driving techniques into the autonomous decision-making protocols of a CAV, such as motor vehicle 10 of FIG. 1, to provision multi-layer co-optimization. In accord with the illustrated example, the iREAD system 100 is generally composed of a Perception Info Fusion & Road World Model (PIRM) module 102, a Route Planner module 104, a Behavioral Planner module 106, a Short-Term Path Planner module 108, and an Actuator Control module 110.

Interoperability of the iREAD system 100 modules provisions multi-layer, multi-resolution energy estimation and optimization, e.g., for "shorter" prediction horizons with deeper levels of control with more information at lower resolutions. The PIRM module 102 generally functions to synthesize and fuse sensor detection data, to percept real-time traffic environment data, and to localize the subject "host" or "ego" vehicle. For instance, target object movement data (e.g., for leading or trailing vehicles, pedestrians, etc.) originating from camera, LIDAR, and RADAR sensors, along with vehicle location data that originates from a GPS exchange, is aggregated, combined, and projected onto a shared 3D coordinate space by the PIRM module 102.

Route Planner module 104 of FIG. 2 generally functions to develop an optimal path for a designated trip in terms of risk, distance, and time from a current position or origin to a desired drop point or final destination. The fused information of host vehicle dynamics and target object dynamics may be passed to the Route Planner module 104 to assign an energy efficient route with corresponding path trajectories, such as lane changes, turns, velocities, etc. By way of comparison, the Behavioral Planner 106 generally functions to ascertain high-level driving behaviors for the host vehicle, such as long-term path/speed decisions based on context-specific traffic data and rules. As an example, eco-behavior planning implements a multi-objective trajectory optimizer that defines a search space and candidate driving strategies, conducts a forward simulation with a receding horizon, and evaluates the cost for a multi-objective cost function. The Short-Term Planner module 108 generally functions to generate a smooth, collision-free trajectory that is designed to reach desired speed and steering targets. Working in collaboration with the Short-Term Planner module 108, the Actuator Control module 110 generally functions to produce and transmit actuation command signals, including steering command, acceleration command, and brake command to drive the host vehicle according to the planed reference trajectory. A high-level Summary of the iREAD system 100 architecture may be found in Table 1:

The iREAD system 100 of FIG. 2 provides a modularized structure with multi-layer energy models that may be adapted for different vehicles and vehicle powertrains. Weighting factors may be adapted for different drivers and driving contexts.

As used herein, the terms control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines. Software, firmware, programs, instructions, routines, code, algorithms, and similar terms may be used interchangeably and synonymously to mean any processor-executable instruction sets, including calibration protocols and look-up tables.

Figure 3:
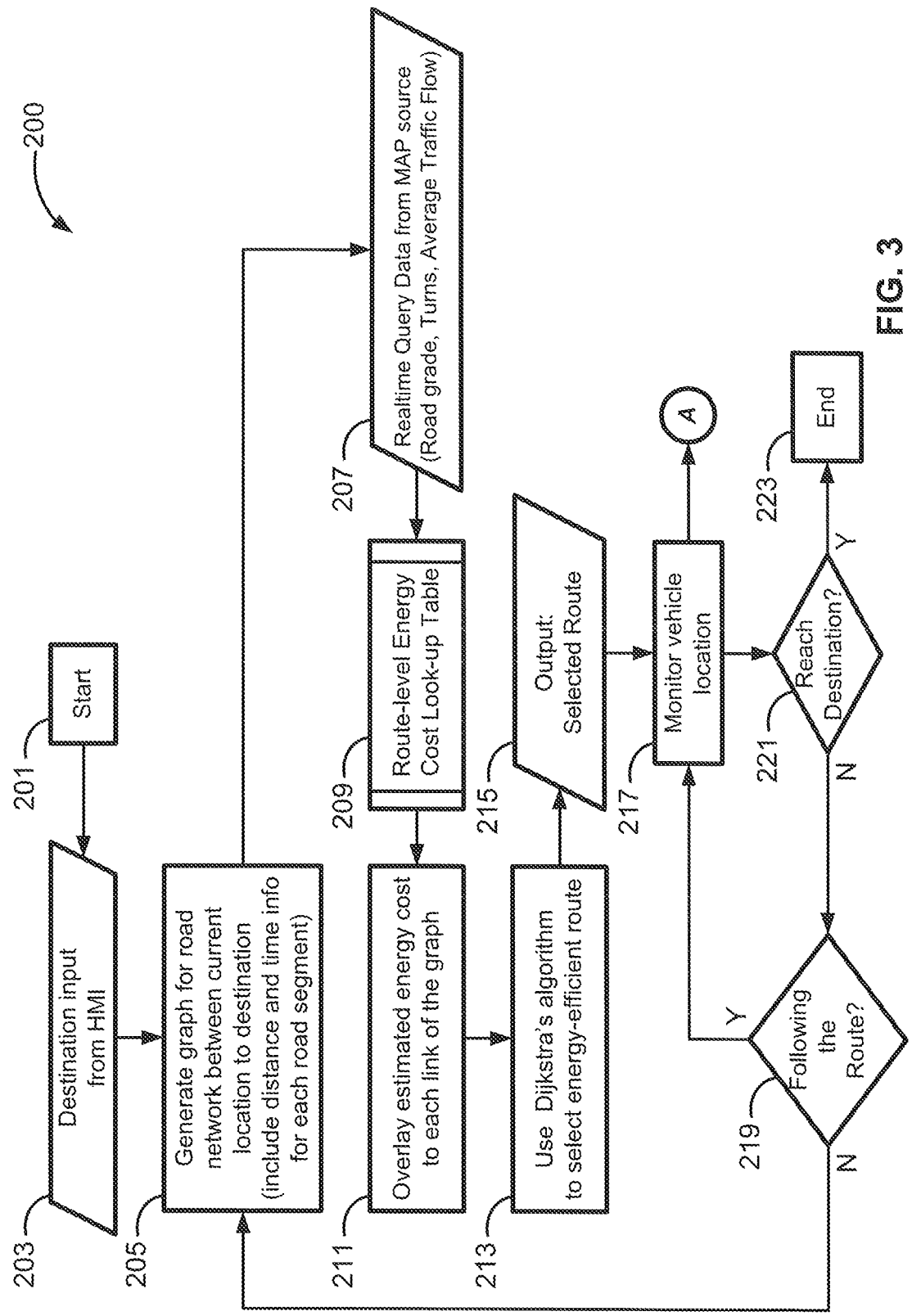
FIG. 3 is a flowchart illustrating a representative iREAD route planner protocol for deriving optimal vehicle routes with lowest estimated energy uses, which may correspond to memory-stored instructions executed by an onboard or remote controller, control-logic circuitry, programmable electronic control unit, or other integrated circuit (IC) device or a network of IC devices in accord with aspects of the disclosed concepts.
Figure 4:
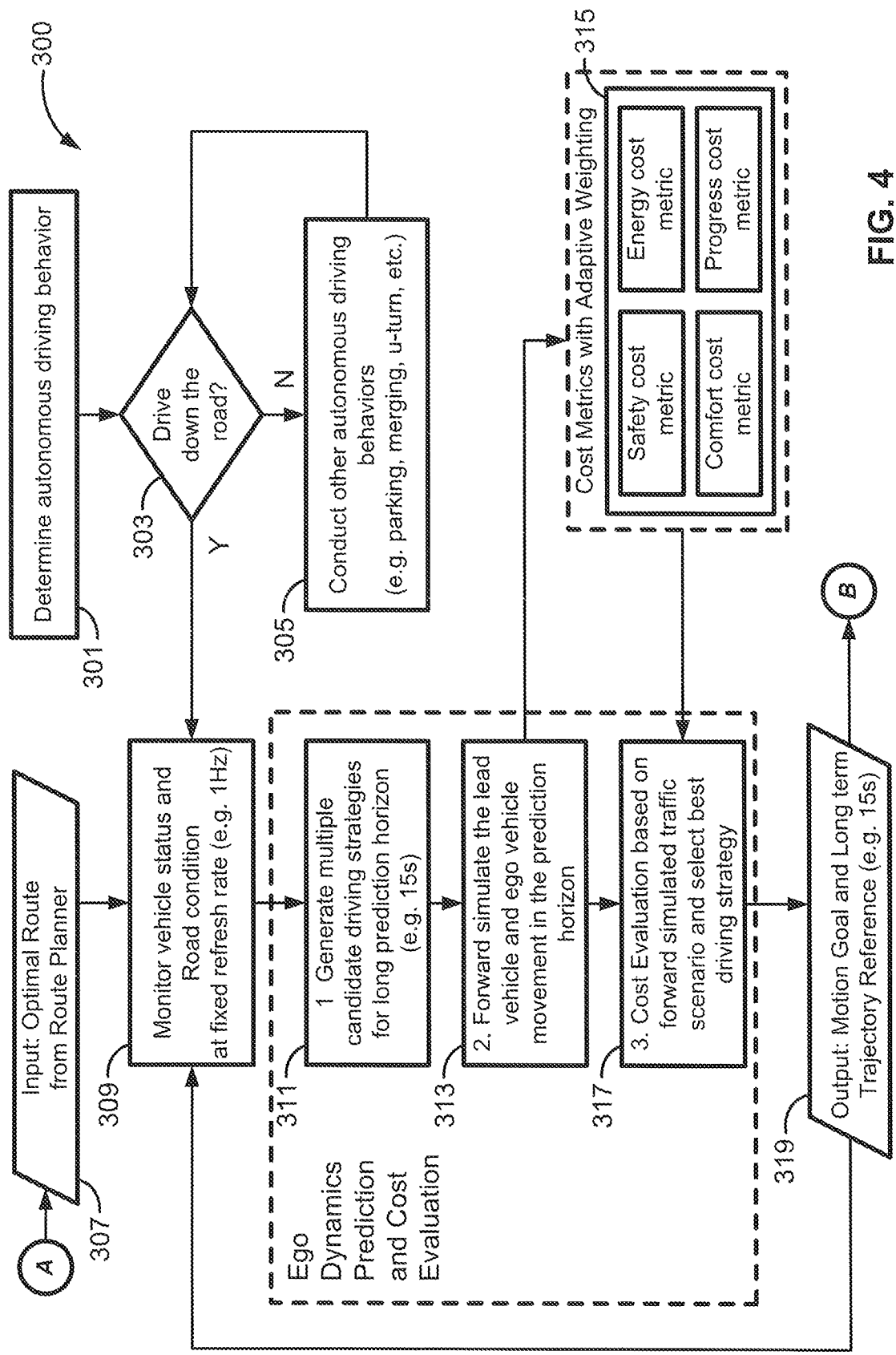
FIG. 4 is a flowchart illustrating a representative iREAD behavior planner protocol for deriving optimal driving strategies based on context-specific traffic data, which may correspond to memory-stored instructions executed by an onboard or remote controller, control-logic circuitry, programmable electronic control unit, or other integrated circuit (IC) device or a network of IC devices in accord with aspects of the disclosed concepts.
Figure 5:
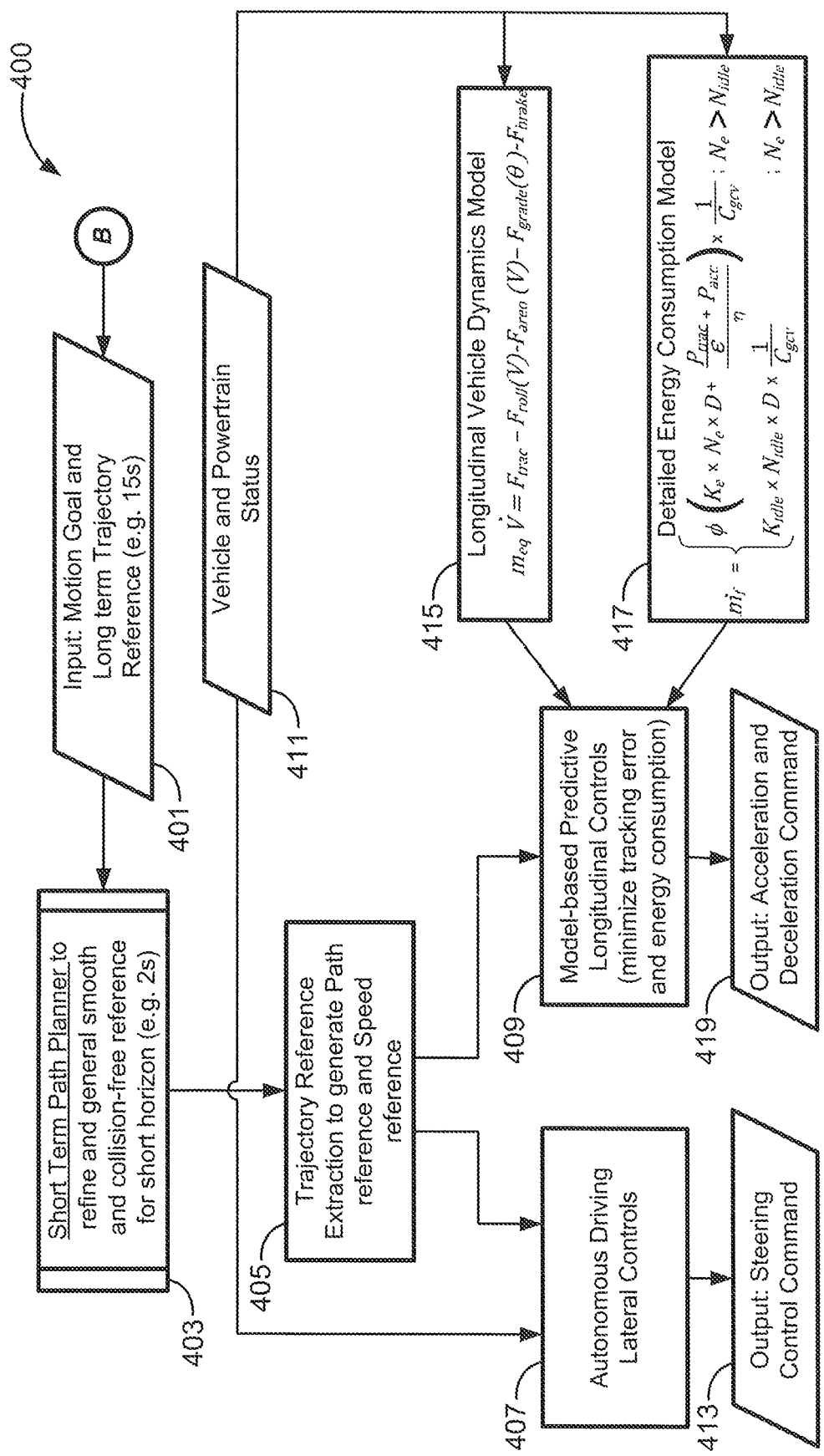
FIG. 5 is a flowchart illustrating representative iREAD actuator control and short-term path planner protocols for deriving smooth and collision-free trajectories and transmitting associated control commands, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flow chart of FIG. 3, an improved method or control strategy for deriving optimal vehicle routes with lowest estimated energy uses is generally described at 200 in accordance with aspects of the present disclosure. Likewise, FIG. 4 presents at 300 an improved method or control strategy for deriving optimal driving strategies based on evaluations of multi-objective cost functions in accordance with aspects of the present disclosure. FIG. 5 illustrates an improved method or control strategy, designated generally at 400, for deriving smooth and collision-free reference trajectories and generating associated autonomous driving control commands in accordance with aspects of the present disclosure. Some or all of the operations illustrated in FIGS. 3-5 and described in further detail below may be representative of an algorithm that corresponds to processor-executable instructions that may be stored, for example, in main or auxiliary or remote memory, and executed, for example, by an onboard or off-board controller, processing unit, control logic circuit, or other module or device or network of modules/devices, to perform any or all of the above or below described functions associated with the disclosed concepts. It should be recognized that the order of execution of the illustrated operation blocks

TABLE 1

| iREAD System | Route Planner | Behavior Planning | Actuator Controls |
|---|---|---|---|
| Each module evaluates respective tradeoffs | Time Distance Fuel | Safety Progress Comfort Fuel | Speed tracking error Controls efforts |
| Energy consumption model | Road segment's LUT (e.g., average effective speed; grade; turns, etc.) | Vehicle-level LUT (e.g., vehicle speed; acceleration; grade, etc.) | PT-level model (e.g., engine RPM; motor RPM; desired torque; trans gear state; accessory, etc.) |
| Optimization horizon | Entire mission | Long Horizon (e.g., 200 m-400 m) | Short Horizon (e.g., less than 60 m) |
| Optimization Algorithm | Dijkstra | Prediction and cost-evaluation algorithm | MPC |
| Output | Route selection | Motion goal Trajectory reference | Actuation command | may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a real-time eco-routing protocol that provides accurate fuel/battery consumption estimates, improves vehicle route planning, and enables multi-layer co-optimization. This routine may be executed in real-time, continuously, systematically, sporadically, and/or at regular intervals, for example, each 100 milliseconds, during active or autonomous vehicle operation. As yet another option, block 201 may initialize responsive to a user prompt from an occupant of the vehicle or a broadcast prompt signal from a backend or middleware computing node tasked with collecting, analyzing, sorting, storing and distributing vehicle data. To carry out this protocol, a vehicle control system or any combination of one or more subsystems may be operable to receive, process, and synthesize pertinent information and inputs, and execute control logic and algorithms to regulate various powertrain system, steering system, brake system, fuel system, and/or battery system components to achieve desired control targets.

As part of or subsequent to the initialization procedure of block 201, a vehicle origin (starting position) and a vehicle destination (ending position) are established at input/output block 203. By way of non-limiting example, a PIRM module 102 operating on resident vehicle telematics unit 14 may execute a navigation processing code segment, e.g., to obtain geospatial data, vehicle dynamics data, timestamp and related temporal data, etc., and optionally display select aspects of this data to an occupant of the vehicle 10. A driver or passenger of vehicle 10 may employ any of the HMI input controls 32 to select a desired origin (or default to the vehicle's current, real-time position) and a desired destination (or a drop-off point along an existing or pre-established route). It is also envisioned that the CPU 36 or telematics unit processors 40 receive vehicle origin and destination information from other sources, such as a server-class computer provisioning data exchanges for the cloud computing service system 24 or a dedicated mobile software application operating on a smartphone or other handheld computing device.

Once a vehicle origin (starting position) and vehicle destination (ending position) are confirmed at input/output block 203, the method 200 executes a geospatial query at input/output block 205 to build a graphical representation of a road network between the vehicle origin and vehicle destination, including obtaining distance and time information for each road segment within the road network. In an example eco-routing procedure, the routing algorithm converts map data into a directed vertex graph with multiple nodes, each representative of an intersection, roadway transition, or other landmark, that are interconnected by interleaved edges, each representative of a highway, byway, or other road section. Candidate routes for traversing from vehicle origin to vehicle destination may be represented as an ordered pair of vertices (numbered nodes) joined by directed arcs (intermediate arrows).

With continuing reference to FIG. 3, input/output block 207 provides instructions for conducting a real-time query for road-level geospatial data from a MAP source, and contemporaneously identifying candidate routes for the vehicle to reach its desired destination. Searches are carried out through all connected nodes or until multiple low-cost candidate routes are identified for the host vehicle to traverse from vehicle origin to vehicle destination. By way of example, and not limitation, the Route Planner module 104 may query the vehicle's real-time geopositional information (i.e., a set of GPS-generated geodetic datum) and temporal information (i.e., a timestamp produced by a real-time clock (RTC) of the CPU 36) in order to identify two or more candidate routes for reaching a selected destination from a given origin. Geospatial information may include, in some non-limiting examples, roadway geometry and boundary data, road shoulder and center location data, gradient data, intersection midpoint location data, etc. Rather than identify a single route option, which may not necessarily provide an optimal travel route for a subject vehicle on a particular day, the geospatial query of input/output block 207 identifies multiple routes corresponding to the vehicle's start and end positions. Eco-routing planner method 200 may concomitantly access an OPENSTREETMAP® (OSM) data service or similarly suitable mapping database to "lookup" road-level data associated with each segment along each candidate route. This baseline "road-level" information may include the interconnecting segments that form a given route, a name for each road segment, a speed limit for each road segment, lane alignment information, traffic light locations, stop sign positions, highway entrance/exit information, etc.

After establishing a vehicle origin and destination (block 203), and multiple candidate routes (blocks 205 and 207), and then aggregating relevant road-level data and roadway traffic/disturbance data for each route (block 207), the method 200 proceeds to predefined process block 209 to determine an estimated total vehicle energy consumption—be it fuel or battery or both—for each candidate route. Total vehicle energy consumption is based, at least in part, on respective traffic, speed and geometry information for that route. Optional implementations also account for driver-specific historical behavior and vehicle-specific operating characteristics, which will be described in extensive detail below. While it is envisioned that this information may be retrieved from any of an assortment of resources, both resident to and remote from the vehicle, it may be desirable that a resident vehicle controller, such as CPU 36 of FIG. 1, execute V2X data exchanges and access cache-memory-stored energy consumption look-up tables. These look-up tables may be generated via any suitable means, including computer simulation, system architecture emulation, crowd-sourced driving data, vehicle-calibrated driving data, etc.

Control operations dictated at predefined process block 209 may be carried out by a resident vehicle navigation system, such as telematics unit 14 of FIG. 1, which may contain path planning software and a database of maps, tables, points of interest, and other geopositional data. Such lookup tables may comprise actual fuel usage data of a representative motor vehicle as a function of vehicle speed and turning angle. These lookup tables may be embodied as a three-dimensional (3D) surface plot exhibiting the functional relationship between multiple vehicle-related variables: fuel consumption (gallons/100 miles) as a dependent variable on the y-axis; vehicle speed (miles per hour) as a first independent variable on the x-axis; and turning angle (degrees) as a second independent variable on the z-axis. Using this information, automated or recommended candidate route selection (or triggered reselection) may be biased towards one or more optimal operating regions, e.g., operating regions that prioritize routes with an average vehicle speed that will result in a minimized fuel/battery consumption, generally irrespective of turning angle. Additional information regarding real-time eco-routing techniques to derive low-cost candidate route options may be found in commonly owned U.S. patent application Ser. No. 16/130, 367, which is entitled "Intelligent Motor Vehicles, Systems, and Control Logic for Real-Time Eco-Routing and Adaptive Driving Control," was filed on Sep. 13, 2018, and is incorporated herein by reference in its entirety and for all purposes.

Advancing from predefined process block 209 to process block 211, the method 200 of FIG. 3 overlays the estimated energy cost of each road segment onto its corresponding edge of the graphical representation of the road network described above. Overlay may be conducted by assigning the individual energy estimations to their specific road links together with associated length/distance data and estimated travel time of that link. At process block 213, a shortest path first (SPF) algorithm is employed to select an energy-efficient candidate route. A route search algorithm, such as a Dijkstra's algorithm, may be implemented to search the graph for a lowest-cost route or routes. For edge-cost eco-routing, each edge may be assigned with a synthesized and weighted cost of time, distance, and energy. In addition, time and distance may be synthesized from static and dynamic map information, which may be supplemented with historical driving, traffic, and/or behavioral data.

A total weighted cost may be typified as a cost for going through a specific road link/segment. In this example, "distance" may be designated as an actual length of a given road segment; "time" may be a predicted travel time of a given road segment that is synthesized from static and/or dynamic information. If only static map data is available, the predicted travel time may be calculated based solely on distance and speed limit. If dynamic "live" traffic data is available, travel time may be predicted from average traffic flow speed instead of speed limit. Historical data may also be used in the absence or live traffic information as well to give a fair estimation of average speed. The relative values of the weighting factors helps to determine the tradeoff among occupant security, trip progress, occupant comfort, and energy expenditure. Sub-weighting factors may be embedded within each cost term to make the calibration more effective. Input/output block 215 transmits the selected route from the Route Planner module 104 to the Behavioral Planner module 106.

At process block 217, real-time host vehicle location is monitored. At decision block 219, the eco-routing planner method 200 ascertains whether or not the host vehicle has reached the desired destination. If not (Block 219=NO), method 200 proceeds to decision block 221 to assess whether or not the vehicle has diverted from the selected "optimal" candidate route. Upon determining that the vehicle is not following the selected route (Block 221=NO), method 200 loops back to process block 205 and iterates back through all subsequent operations. However, if the vehicle is following the selected route (Block 221=YES), method 200 returns to block 217 to ascertain the host vehicle's real-time location and then to decision block 219 to confirm that the host vehicle has reached the desired destination. Once confirmed (Block 219=YES), the method 200 of FIG. 3 may advance to terminal block 223 and terminate, or may loop back to terminal block 201 and run in a continuous loop.

Turning next to FIG. 4, the eco-behavior planner method 300 begins at terminal block 301 with a sub-routine prompt to commence with determining autonomous driving behaviors for the host vehicle to achieve target energy, comfort, and timing goals for a given trip along a designated candidate route. In this regard, decision block 303 provides processor-executable instructions for a programmable controller or control module or similarly suitable processor, such as telematics processor(s) 40 in cooperation with a long-range vehicle communications device 42, to assess whether or not the host vehicle is currently in motion or about to embark along a selected optimal candidate route. Responsive to a negative assessment (Block 303=NO), method 300 of FIG. 4 proceeds to process block 305 to initiate one or more alternative controller-automated driving operations (e.g., an intelligent parking assist operation, an auto steer operation, a CAS braking/lane-changing operation, etc.). Once complete, the method 300 may return to process block 303.

Upon determining that the host vehicle is currently in motion (Block 303=YES), the Behavioral Planner module 106 responsively receives optimal route data from the Route Planner module 104, as indicated at input/output block 307. With this information, method 300 provides instructions at process block 309 to monitor the host vehicle's current real-time status and any related road conditions that may affect the selected candidate route. For at least some preferred implementations, the vehicle status and road condition monitoring is conducted systematically at a fixed refresh rate, e.g., of 1 Hertz (Hz). Process block 309 may include monitoring: ego vehicle speed of the host vehicle, lead vehicle speed of a lead vehicle forward of the host vehicle, headway gap distance between the host and lead vehicles, current roadway speed limit, distance to next stop sign, distance to next traffic light, traffic light signal, phase and timing (SPaT) data.

Continuing with the discussion of the eco-behavior planner method 300 of FIG. 4, the Behavioral Planner module 106 conducts a multi-objective trajectory optimization by defining a search space and candidate driving strategy, conducting a forward simulation of vehicle behavior across a receding horizon, and evaluates the cost for a multi-objective cost function:

$$\text{Cost} = \Sigma_{t=0}^{Horizon} k_1 C_{safety} + k_2 C_{progress} + k_3 C_{comfort} + k_4 C_{fuel}$$

To begin, process block 311 provides processor-executable instructions to generate multiple candidate driving strategies for the selected candidate route across a fixed "long" prediction horizon (e.g., about 15-20 seconds). Each candidate driving strategy may generally comprise a speed profile and an acceleration profile for governing the host vehicle's powertrain output for the duration of the designated trip across the selected route. There are numerous different ways of generating driving strategies, including direct and indirect methodologies. A direct method may include enumerating a time array of multiple possible vehicle speeds (e.g., between a minimum non-hazardous speed and a state-set speed limit). Comparatively, an example of an indirect method may include sweeping a time array of the headway gap distance between ego and lead vehicles, then translating the time array of headway back to speed profiles. Interaction with surrounding traffic, especially the lead vehicle, may oftentimes be the most dynamic and critical part of driving. As such, on-line driving strategy optimization may focus on selecting an optimal headway gap: headway search range (about 0.5 to 5.0 seconds (s)) may be designated as a "normal" headway. Energy conservation benefits may be realized from car-following behavior that avoids unnecessary acceleration/deceleration by predicting lead vehicle movement and adjusting the flexible headway. Predicted lead vehicle speed and optimized headway gap translates back to ego vehicle speed profiling. These drive cycle metrics may be represented as an average speed, an average acceleration, and stops per mile (or comparable unit) over each segment of a candidate route.

Contemporaneous with or after producing the candidate driving strategies with attendant speed and acceleration profiles, method 300 executes process block 313 to forward simulate the lead vehicle and host vehicle movement within a fixed prediction horizon. Based on each hypothetical driving strategy of the ego vehicle and the predicted future speed profile of lead vehicle, the Behavioral Planner module 106 simulates host vehicle acceleration, travel distance, and gap for the next time horizon (e.g., approximately 15 s). By way of clarification, and not limitation, given current measurements and/or estimates of respective positions, orientations, and speeds of nearby target vehicles, in conjunction with available historical data for related variables, a host vehicle is able to simulate movement of each target vehicle and thereby predict their future positions, orientations, and speeds. Similarly, for a given vehicle operation employed to perform a maneuver, the host vehicle employs comparable simulation techniques to predict a trajectory and related operation parameters for completing the action.

The forward-simulated movement data is passed to process block 315 to assess various cost metrics—time, comfort, energy, security—that constrain the cost evaluation for driving strategy selection. A time of driving cost, which may also be referenced herein as "progress cost," includes a gap error cost that looks at a gap deviation from a default gap and, optionally, adapts the deviation to traffic density. The progress cost may additionally include an arrival time cost, e.g., with a virtual destination placed at the end of a prediction horizon of a behavior layer (e.g., 200 or 400 m) and adapted for upcoming traffic lights, intersections, traffic jams, etc. A comfort cost may delimit occupant exposure to whole-body vibration as well as establishing a weighted root-mean-square acceleration (WRMSA) that comprehensively considers occupant-perceived acceleration directions, amplitudes, and frequencies. Energy consumption costs were described above with respect to the cost-expenditure predictions of the Route Planner module 104 in FIG. 3. Occupant security cost, on the other hand, restricts occupant exposure to potentially hazardous driving scenarios.

With continuing reference to FIG. 4, the method 300 conducts a cost evaluation at process block 317 based on the aforementioned cost metrics as well as the forward-simulated ego vehicle dynamics and traffic scenario data to select a "best" driving strategy. Each cost metric, be it occupant security, energy use, route progress, or occupant comfort, may be calculated from the vehicle speed, acceleration, travel distance, and gap that have been generated in previous steps. The total cost for each driving strategy is then mathematically summed and thereafter compared to the total costs of other available driving strategies. In this instance, the driving strategy associated with the lowest overall cost may be designated as the optimal driving strategy to be executed on the selected candidate route. This information is transmitted to the Short-Term Path Planner module 108 and Actuator Control module 110 at input/output block 319.

Referring next to FIG. 5, the actuator control and short-term path planner method 400 begins at input/output block 401 with the Short-Term Path Planner module 108 receiving motion goal and long-term trajectory reference data from the Behavioral Planner module 106, e.g., for a fixed time horizon (e.g., approximately 15 s). For short-term planning, Short-Term Path Planner module 108 may execute a desired behavior plan as a controlled simulation, and implements modulated transient operations to enhance occupant experience while invoking evasive maneuvers to avoid predicted obstacles. In general, the Short-Term Path Planner module 108 may receive as inputs a set of motion goals (e.g., drive down the road, slow to stop at predicted red light, turn right at next intersection, etc.), a set of motion parameters (e.g., speed, acceleration, safe following distance, etc.) and a set of predicted target objects (e.g., moving obstacles, static obstacles, etc.); outputs may include a trajectory reference to one or more actuator controllers. Actuator control, on the other hand, may use a suitable Model Predictive Control (MPC) based algorithm to perform low-level optimization and provide smooth tracking of a previewed path reference. Problem formulation for the MPC-based algorithm may include an energy consumption model, a vehicle dynamics model, a cost function, and constraints.

Continuing to predefined process block 403, Short-Term Path Planner module 108 executes memory-stored instructions to refine and smooth the received motion goal and long-term trajectory reference data, and selectively modifies the selected candidate route and optimal driving strategy to ensure a collision-free reference trip for a fixed "short" horizon (e.g., about 2 s). In the autonomous motor vehicle domain, for example, Short-Term Path Planner module 108 operates as an automated "motion planner" that generates smooth trajectories to connect high-level goals from a current check point's speed/location to a subsequent check point's speed/location. Concomitantly, Planner module 108 will also check the selected route and driving strategy to ascertain whether or not the smoothed references have a high likelihood of leading to a collision with a target object; if a predicted collision exists, aspects of the reference route/strategy will be altered or "nudged" to obviate any such collision.

With continuing reference to FIG. 5, the method 400 proceeds to process block 405 to conduct a trajectory reference extraction to generate a path reference and a speed reference. By and large, a vehicle trajectory may consist of two sets of information: a path data set, which defines a trace on a designated road for a host vehicle to follow to reach a desired destination; and a speed data set, which defines a vehicle speed for each reference point of the trace. At this juncture, Short-Term Path Planner module 108 is completing and decoupling path data and speed data. In this instance, a path reference data set and a speed reference data set are generated for the optimal candidate driving strategy through a trajectory reference extraction that: (1) decouples path data from the candidate route with the lowest estimated total energy use; and (2) decouples speed data from the respective speed and acceleration profiles of the optimal candidate driving strategy. Once trajectory is decoupled for path reference and speed reference derivation, the longitudinal control approach may also optimize both tracking and energy consumption at the same time. In this instance, longitudinal control may consider the powertrain and vehicle characteristics while it is tracking the speed reference provided by an upper layer. Incidentally, the finalized reference path data set is transmitted to the Actuator Control module 110 at process block 407 for lateral control machination, whereas the finalized reference speed data set is transmitted to the Actuator Control module 110 at process block 409 for longitudinal control machination. For process block 407, Actuator Control module 110 produces the requisite lateral control commands responsible for automating vehicle maneuvering to follow the selected candidate route. The lateral control commands are based, at least in part, on real-time vehicle and powertrain status information retrieved at input/output block 411. Once generated, Actuator Control module 110 transmits these control commands to a steering control module to govern operation of the vehicle's steering system at input/output block 413.

Process block 409 of FIG. 5 implements an MPC-based algorithm to derive a set of longitudinal control commands that provide for real-time vehicle speed and acceleration/deceleration to achieve the speed and acceleration profiles for the chosen "optimal" candidate route, e.g., while minimizing tracking error and energy consumption. As part of this process, method 400 continues to process block 415 with instructions for the Actuator Control module 110 to implement the following longitudinal vehicle dynamics model:

$$m_{eq}\dot{V}=F_{trac}-F_{roll}(V)-F_{aero}(V)-F_{grade}(\theta)-F_{brake}$$

where $F_{trac}$ is a traction force; $F_{roll}$ is a rolling resistance (friction force); $F_{aero}$ is an air drag; $F_{grade}$ is a gravity force; and $F_{brake}$ is a brake force. For vehicle implementations in which the powertrain's prime mover includes an internal combustion engine (ICE) assembly, detailed energy consumption may be modelled at process block 417 with the following fuel consumption model:

$$\dot{m}_f[g/s] = \begin{cases} \phi\left(K_e \times N_e \times D + \dfrac{\dfrac{P_{trac}}{\epsilon} + P_{acc}}{\eta}\right) \times \dfrac{1}{C_{gcv}} & ; N_e > N_{idle} \\ K_{idle} \times N_{idle} \times D \times \dfrac{1}{C_{gcv}} & ; N_e \leq N_{idle} \end{cases}$$

where $\phi$, $N_e$, and $N_{idle}$ denote a fuel/air equivalence ratio, an engine speed, and an engine idling speed, respectively; D is an engine displacement parameter; $P_{trac}$ and $P_{acc}$ are power terms; $\eta$ is an engine efficiency factor; and $\epsilon$ is a vehicle drivetrain efficiency factor. Engine displacement D may have multiple values depending, for example, on an Active Fuel Management (AFM) mode (e.g., about 3.62 for 6-cylinder ICE operation, and about 2.41 for 4-cylinder ICE operation). The power terms $P_{trac}$ and $P_{acc}$ respectively denote the tractive power and the power request for in-vehicle accessories, such as air conditioning, heated seats, radio, etc. The efficiency $\eta$ is for the engine indicated efficiency and E for the vehicle drivetrain efficiency. There is also a gasoline gross calorific value $C_{gcv}$ (e.g., approximately 43.4 kJ/g), and two tunable parameters: $K_e$ and $K_{idle}$. Once generated, Actuator Control module 110 transmits the longitudinal control commands to a powertrain control module to govern operation of the vehicle's powertrain output at input/output block 419.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling automated driving operations of a motor vehicle, the method comprising:

determining, via a vehicle controller of the motor vehicle, a vehicle origin and a vehicle destination for the motor vehicle;

conducting, via the vehicle controller using a memory-stored map database, a geospatial query to generate a graphical representation of a road network between the vehicle origin and the vehicle destination with multiple candidate routes for the motor vehicle;

receiving, via the vehicle controller, respective road-level data associated with each of the candidate routes, the road-level data including speed, turn angle, and/or gradient data;

estimating, via the vehicle controller based on the respective road-level data, a respective total energy use of the motor vehicle to traverse from the vehicle origin to the vehicle destination across each of the candidate routes;

determining, for the candidate route with a lowest of the estimated total energy uses, multiple candidate driving strategies each having respective speed and acceleration profiles;

selecting an optimal driving strategy from the candidate driving strategies through a cost evaluation of the associated speed and acceleration profiles and a forward simulation of movement of the motor vehicle and a lead vehicle over a calibrated prediction horizon, the optimal driving strategy corresponding to the candidate driving strategy having a multi-objective cost function with a lowest cost value, the multi-objective cost function including multiple cost metrics each calculated from a respective one of the speed and acceleration profiles and the forward simulation of the movement of the motor vehicle and the lead vehicle, wherein selecting the optimal driving strategy includes:
calculating, for each of the candidate driving strategies, respective occupant security, energy consumption, progress, and occupant comfort cost metrics based on the respective speed and acceleration profiles associated with the candidate driving strategy, and
calculating, for each of the candidate driving strategies, a respective total cost as a mathematical sum of the respective occupant security, energy consumption, progress, and occupant comfort cost metrics over a fixed time horizon; and
transmitting, via the vehicle controller, a command signal to a vehicle steering system and/or a powertrain of the motor vehicle to execute a control operation based on the optimal candidate driving strategy for the candidate route with the lowest estimated total energy use.

2. The method of claim 1, wherein generating the graphical representation of the road network between the vehicle origin and the vehicle destination includes:
dissecting each of the candidate routes into multiple adjoining road segments; and
determining respective distance and time data for each of the road segments based on the received road-level data.

3. The method of claim 2, wherein estimating the respective total energy use of the motor vehicle for each of the candidate routes includes determining segment-level energy uses by evaluating the respective road-level data of each of the corresponding road segments against a memory-stored table correlating energy consumption to speed, turn angle, and/or gradient.

4. The method of claim 3, further comprising:
overlaying each of the segment-level energy uses with a respective graph edge representing the road segment in the graphical representation of the road network; and
determining the candidate route with the lowest of the estimated total energy uses by applying a Dijkstra algorithm to the graphical representation of the road network with the overlaid segment-level energy uses.

5. The method of claim 4, further comprising assigning each of the graph edges with a respective weighted and synthesized cost of time, distance, and energy.

6. The method of claim 5, wherein determining the distance and time data for each of the road segments includes synthesizing the respective distance and time data from static and dynamic map information with historical driving data for the corresponding road segment.

7. The method of claim 1, further comprising monitoring vehicle status and road condition data at a fixed refresh rate, the vehicle status and road condition data including a host vehicle speed of the motor vehicle, a lead vehicle speed of the lead vehicle, a headway gap distance between the motor vehicle and the lead vehicle, a real-time speed limit, and a distance to a next stop sign and/or stop light.

8. The method of claim 1, wherein determining the multiple candidate driving strategies includes:
dissecting each of the candidate routes into multiple adjoining road segments; and
cataloguing a time array of vehicle speeds for each of the road segments in a fixed time horizon as limited by a real-time speed limit and traffic data.

9. The method of claim 1, wherein determining the multiple candidate driving strategies includes:
dissecting each of the candidate routes into multiple adjoining road segments;
determining a time array of estimated headway gap distances between the motor vehicle and the lead vehicle for each of the road segments;
predicting a lead vehicle speed profile of the lead vehicle for each of the road segments; and
determining a respective speed profile of the motor vehicle for each of the road segments in a fixed time horizon based on the time array of estimated headway gap distances and the predicted lead vehicle speed profiles as limited by a real-time speed limit and traffic data for the road segment.

10. The method of claim 1, further comprising deriving the forward simulation of movement of the motor vehicle and the lead vehicle over the calibrated prediction horizon based on the candidate driving strategies of the motor vehicle, estimated lead vehicle speeds and accelerations of the lead vehicle, and estimated headway gap distances between the motor vehicle and the lead vehicle over a receding time horizon.

11. The method of claim 1, further comprising processing the optimal driving strategy with a short-term path planner to refine and smooth the respective speed and acceleration profiles associated with the optimal driving strategy.

12. The method of claim 11, further comprising generating a path reference data set and a speed reference data set for the processed optimal driving strategy through a trajectory reference extraction that decouples path data from the candidate route with the lowest estimated total energy use and decouples speed data from the respective speed and acceleration profiles of the optimal driving strategy.

13. The method of claim 12, wherein the command signal includes:
an autonomous lateral steering control command derived from the path reference data set and transmitted to the vehicle steering system; and
an autonomous longitudinal speed and acceleration control command derived from the speed reference data set and transmitted to the vehicle powertrain.

14. The method of claim 1, wherein estimating the respective total energy use for each of the candidate routes includes:
dissecting each of the candidate routes into multiple adjoining road segments;
determining a vehicle speed and a turning angle for each of the road segments;
determining a respective fuel usage for each of the road segments as a function of the vehicle speed and the turning angle of the road segment; and
aggregating the fuel usages for all of the road segments of the candidate route.

15. The method of claim 1, wherein estimating the respective total energy use of the motor vehicle to traverse each of the candidate routes includes fusion of real-time traffic, speed, and geometry information for the candidate route with driver-specific historical behavior and vehicle-specific operating characteristics.

16. The method of claim 1, further comprising determining which of the candidate routes has the lowest of the estimated total energy uses using a synthesized and weighted cost of time, distance, and energy for each of the candidate routes.

17. A method for controlling automated driving operations of a motor vehicle, the method comprising:
   determining, via a vehicle controller of the motor vehicle, a vehicle origin and a vehicle destination for the motor vehicle;
   conducting, via the vehicle controller using a memory-stored map database, a geospatial query to generate a graphical representation of a road network between the vehicle origin and the vehicle destination with multiple candidate routes for the motor vehicle;
   receiving, via the vehicle controller, respective road-level data associated with each of the candidate routes, the road-level data including speed, turn angle, and/or gradient data;
   estimating, via the vehicle controller based on the respective road-level data, a respective total energy use of the motor vehicle to traverse from the vehicle origin to the vehicle destination across each of the candidate routes;
   determining, for the candidate route with a lowest of the estimated total energy uses, multiple candidate driving strategies each having respective speed and acceleration profiles;
   selecting an optimal driving strategy from the candidate driving strategies through a cost evaluation of the associated speed and acceleration profiles and a forward simulation of movement of the motor vehicle and a lead vehicle over a calibrated prediction horizon;
   processing the optimal driving strategy with a short-term path planner to refine and smooth the respective speed and acceleration profiles associated with the optimal driving strategy;
   generating a path reference data set and a speed reference data set for the processed optimal driving strategy through a trajectory reference extraction that decouples path data from the candidate route with the lowest estimated total energy use and decouples speed data from the respective speed and acceleration profiles of the optimal driving strategy; and
   transmitting, via the vehicle controller, a command signal to a vehicle steering system and/or a powertrain of the motor vehicle to execute a control operation based on the optimal driving strategy for the candidate route with the lowest estimated total energy use.

18. The method of claim 17, wherein selecting the optimal driving strategy through the cost evaluation includes:
   calculating, for each of the candidate driving strategies, respective occupant security, energy consumption, progress, and occupant comfort cost metrics based on the respective speed and acceleration profiles associated with the candidate driving strategy; and
   calculating, for each of the candidate driving strategies, a respective total cost as a mathematical sum of the respective occupant security, energy consumption, progress, and occupant comfort cost metrics over a fixed time horizon.

19. The method of claim 17, wherein generating the graphical representation of the road network between the vehicle origin and the vehicle destination includes:
   dissecting each of the candidate routes into multiple adjoining road segments; and
   determining respective distance and time data for each of the road segments based on the received road-level data.

20. The method of claim 19, wherein estimating the respective total energy use of the motor vehicle for each of the candidate routes includes determining segment-level energy uses by evaluating the respective road-level data of each of the corresponding road segments against a memory-stored table correlating energy consumption to speed, turn angle, and/or gradient.

21. The method of claim 17, further comprising monitoring vehicle status and road condition data at a fixed refresh rate, the vehicle status and road condition data including a host vehicle speed of the motor vehicle, a lead vehicle speed of the lead vehicle, a headway gap distance between the motor vehicle and the lead vehicle, a real-time speed limit, and a distance to a next stop sign and/or stop light.

22. The method of claim 17, wherein determining the multiple candidate driving strategies includes:
   dissecting each of the candidate routes into multiple adjoining road segments; and
   cataloguing a time array of vehicle speeds for each of the road segments in a fixed time horizon as limited by a speed limit and traffic data.

23. A method for controlling automated driving operations of a motor vehicle, the method comprising:
   determining, via a vehicle controller of the motor vehicle, a vehicle origin and a vehicle destination for the motor vehicle;
   conducting, via the vehicle controller using a memory-stored map database, a geospatial query to generate a graphical representation of a road network between the vehicle origin and the vehicle destination with multiple candidate routes for the motor vehicle;
   receiving, via the vehicle controller, respective road-level data associated with each of the candidate routes, the road-level data including speed, turn angle, and/or gradient data;
   estimating, via the vehicle controller based on the respective road-level data, a respective total energy use of the motor vehicle to traverse from the vehicle origin to the vehicle destination across each of the candidate routes;
   determining, for the candidate route with a lowest of the estimated total energy uses, multiple candidate driving strategies each having respective speed and acceleration profiles;
   selecting an optimal driving strategy from the candidate driving strategies through a cost evaluation of the associated speed and acceleration profiles and a forward simulation of movement of the motor vehicle and a lead vehicle over a calibrated prediction horizon, wherein selecting the optimal driving strategy includes:
   calculating, for each of the candidate driving strategies, respective occupant security, energy consumption, progress, and occupant comfort cost metrics based on the respective speed and acceleration profiles associated with the candidate driving strategy, and
   calculating, for each of the candidate driving strategies, a respective total cost as a mathematical sum of the respective occupant security, energy consumption, progress, and occupant comfort cost metrics over a fixed time horizon; and
   transmitting, via the vehicle controller, a command signal to a vehicle steering system and/or a powertrain of the motor vehicle to execute a control operation based on the optimal driving strategy for the candidate route with the lowest estimated total energy use.

* * * * *